July 17, 1973  F. REINKE  3,746,589
METHOD OF MAKING BUBBLE-FREE, FIBER REINFORCED PLASTIC
LAMINATES BY TAMPING OPERATIONS
Filed Nov. 3, 1970  10 Sheets-Sheet 1

Inventor:
FRITZ REINKE
by [signature]
Attorney

Inventor:
FRITZ REINKE
Attorney

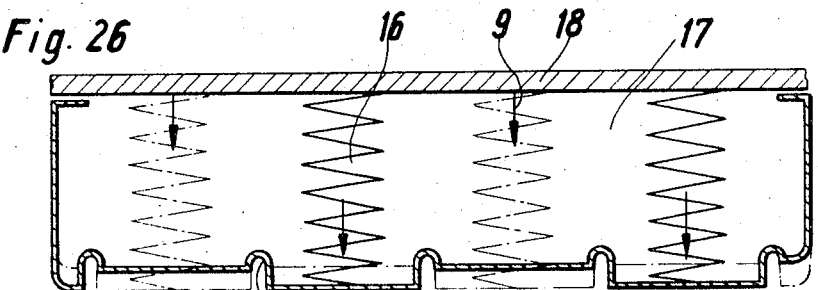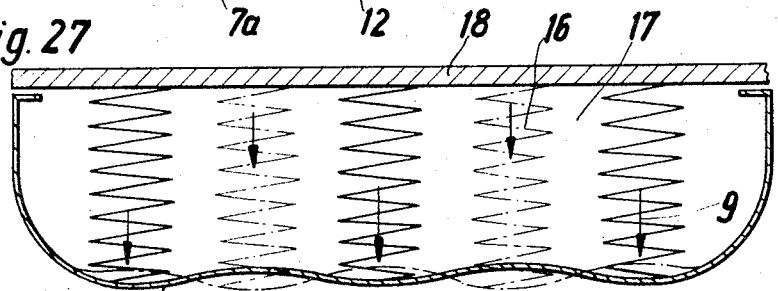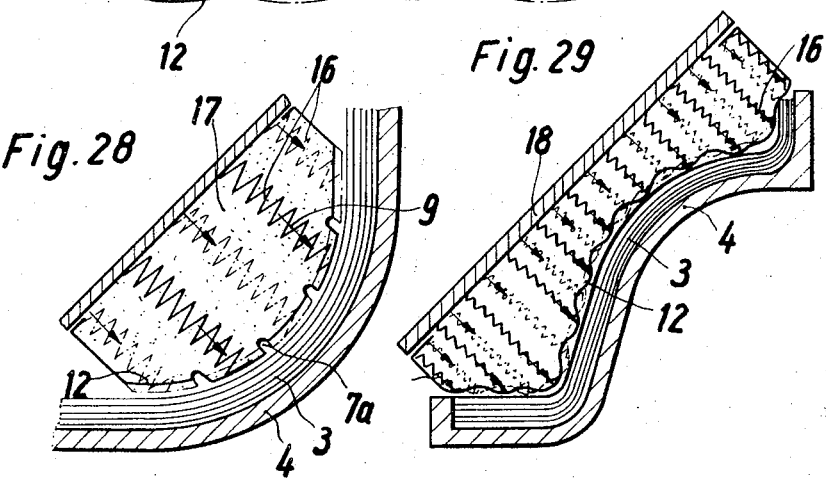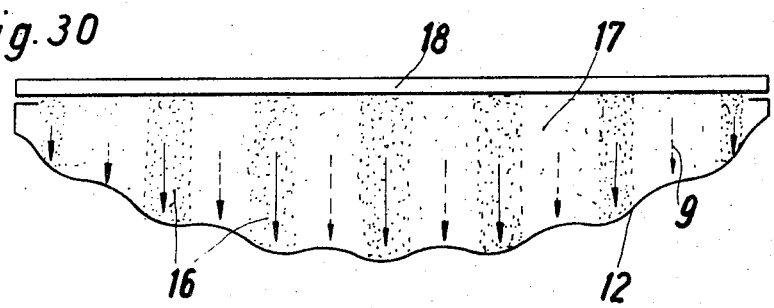

Inventor:
FRITZ REINKE

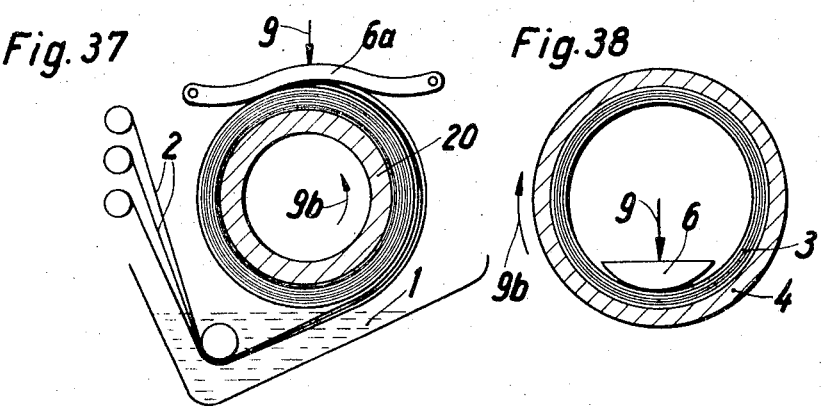
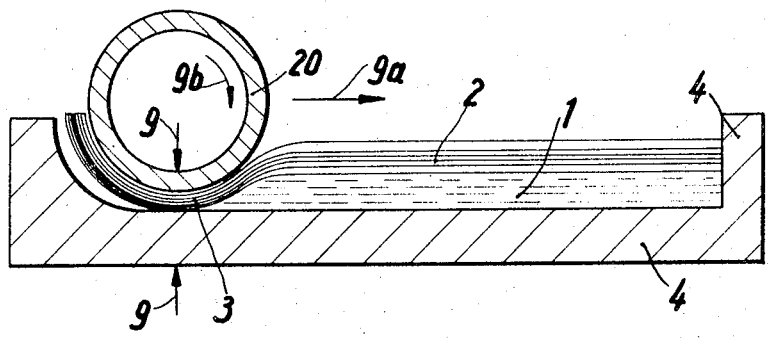
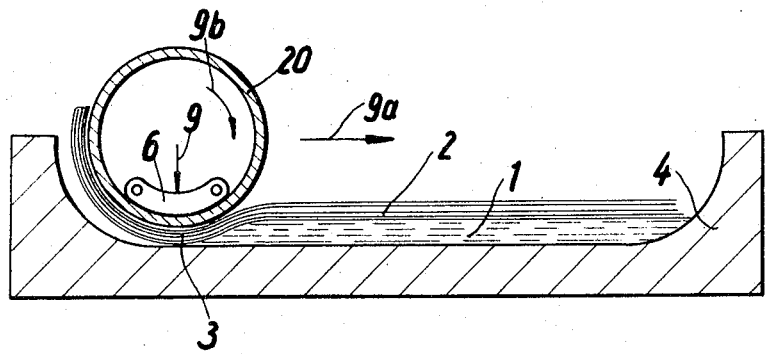

Inventor:
FRITZ REINKE
Attorney

Fig. 47
Fig. 48
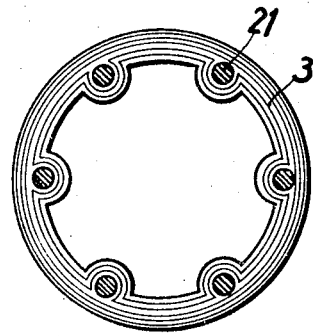
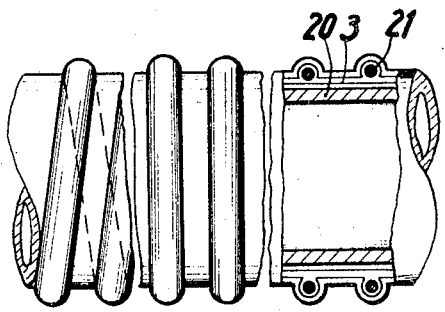
Fig. 49
Fig. 50
Fig. 51
Fig. 52
Fig. 53
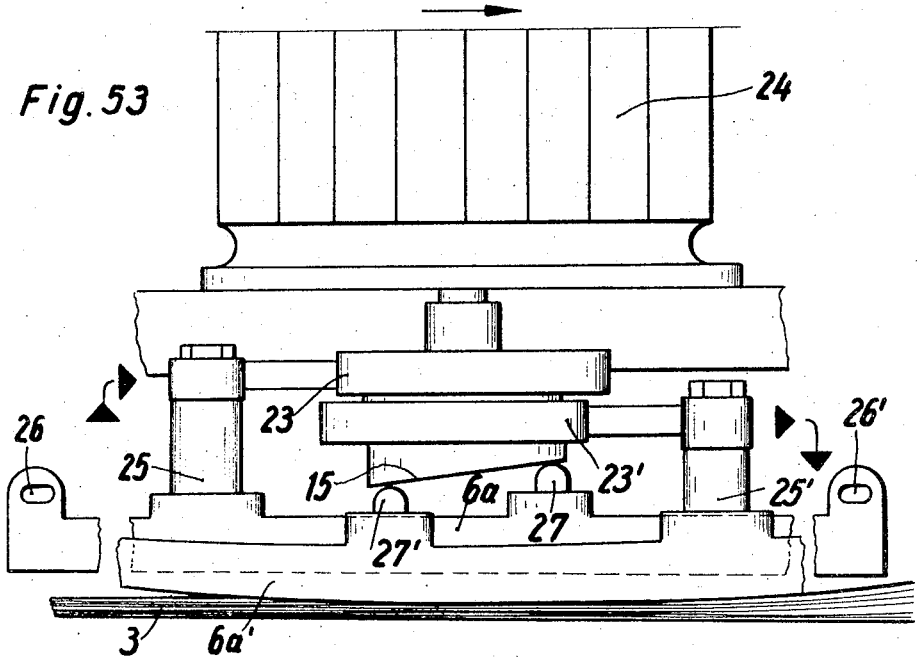
Inventor:
FRITZ REINKE
Attorney United States Patent Office 3,746,589
Patented July 17, 1973

3,746,589
METHOD OF MAKING BUBBLE-FREE, FIBER REINFORCED PLASTIC LAMINATES BY TAMPING OPERATIONS
Fritz Reinke, Neckarstrasse 55, Erbach, Germany
Filed Nov. 3, 1970, Ser. No. 86,510
Claims priority, application Germany, Nov. 7, 1969,
P 19 56 134.3
Int. Cl. B29c 27/04; B28b 1/08
U.S. Cl. 156—73                                      7 Claims

ABSTRACT OF THE DISCLOSURE

Method and apparatus for making articles, such as building components, by tamping a layer of fibrous material into a layer of liquid plastic material. The tamping is performed by directing blows on the layers in adjacent areas arranged like a grid, whilst the layers are moved relative to the areas. The amplitude of the blows within the individual areas decreases from a region of maximum amplitude towards the place where the layers leave the area.

BACKGROUND OF THE INVENTION

For a considerable time plastics have been processed together with fibrous materials, particularly glass fibres, by various methods.

Of these methods particular mention can be made of hand-laminating, vacuum moulding, pressure moulding, winding, centrifugal moulding and drawing. These give perfectly satisfactory results for many purposes. For the much used thermosetting polyester resins with a more or less liquid consistency, however, there is no method which can enable fibre-reinforced plastic materials to be made cheaply without any air bubbles, particularly if building components with a large area have to be produced. For many applications what is required, for reasons of operating technique, is for bubble-free, fibre-reinforced plastic laminates to be made by a cheap process which can be applied to mass production.

SUMMARY OF THE INVENTION

One object of the present invention is to provide a new or improved method and apparatus for manufacturing articles from fibre-reinforced plastic material.

According to the present invention there is provided a method of manufacturing articles from fibre-reinforced plastic material, comprising the steps of making a laminated layer consisting of liquid plastic material and embedded fibrous material, tamping said laminated layer by directing blows substantially perpendicular to the base of said layer in adjacent areas arranged like a grid, and moving said layer relative to said areas, the amplitude of the blows within the individual areas decreasing from a region of maximum amplitude towards the place where said laminated layer leaves said areas.

It has been found that this makes the enclosed air bubbles in the tamped areas of material move to the edges of those areas and then move towards the surface.

It is desirable to have two groups of tamped areas, the blows alternating between the two groups and each areas in one group being arranged between two areas of the other group.

It is an advantage for the tamped areas to be moved relative to the already processed layers during the process of combining the two layers, in such a way that successive blows in one direction act in progressive stages on the tamped material. In many cases it is preferable for the tamping direction to contain a component in the direction of the transporting movement.

A step which has proved successful in this connection is to mount the apparatus for exerting the blows on wheels which are guided over the layer of plastic and fibrous material, the wheels preferably being in the form of broad grooved rollers.

The manufacturing process is much facilitated, particularly in the case of mass production, if the material in one group of tamped areas is held down after the end of the tamping blow, until the tamping action for the next blow begins in the other group of areas. With a view to optimum de-aeration of the laminate it has been found advantageous to have spacings between adjacent tamped areas of 0.1 to 10 mm., particularly 0.1 to 4 mm., and preferably 0.1 to 2 mm.

In a preferred method, before polymerisation of said plastic material reaches its final stage, the tamped areas, which are separated by 0.01 mm. to 5 mm., are struck with at least 25 p./cm.$^2$ with a frequency between 25 and 250 per second by impulse transmitters in the form of pressure pads, the pressing surfaces adjacent the pressure pads being moved so that the distance, measured in direction of the pressure between acting surfaces of adjacent pressure pads, is not more than 6 mm. and the shape of said pressure pads so chosen that the distance between any point of the pressing surface and the rim of said surfaces is not greater than 6 mm. The frequency of the blows may be between 30 and 60 per second, and the distance between the pressing surfaces of adjacent pressure pads in their middle position is in the range 0.1 mm. to 1.2 mm.

This offers the advantage that the surface of the pressed layer cannot follow the restricting movement of the pressing surface of the pressure pads. This grid can also be made of wire having openings 6 mm. by 6 mm.

A grid, for example a plate with holes, adapted to such shape may be placed on the laminated layer and blows directed on the outer surface of said grid by means of an impulse transmitter which is moved along the outer surface of said grid.

According to the present invention there is also provided an apparatus for manufacturing articles from fibre-reinforced plastic material, comprising a base for supporting a layer of liquid plastic material and a superimposed layer of fibrous material, tamping means for directing blows at both said layers in adjacent areas arranged like a grid, and means for moving both layers relative to said areas, the tamping means being such that the amplitude of the blows within the individual areas decreases from a region of maximum amplitude towards the place where said layers leave that area.

According to one feature of the invention the blows, initiated mechanically, electrically, by resonance fields or other known technical measures, are transmitted to the layers via a diaphragm. In this modification, the distance between adjacent tamped areas play a smaller part, since the buildup of pressure in the tamped region is ensured by the diaphragm. It is adavntageous in many cases for the width of the tamped areas to differ between the two groups, and for one group, preferably that with the narrower areas, to be tamped with a higher freqeuncy and a smaller amplitude than the areas of the other group.

Pressure pads, which are moved relative to the laminate are well suited for transmitting the impulse-like blows to the layers. Resilient pressure pads, which are moved so that the tamping amplitude is greatest in the central portion of the pad, have proved particularly successful.

In many cases it has been found advantageous for the blows to be transmitted to the layers to be combined, by means of a resiliently swinging diaphragm-like plate which acts on the layers with maximum amplitude in the central portion, but which exerts no tamping action or a substantially weaker one on the material at two opposed sides extending transversely to the entry and discharge sides of the layers. For various applications it is desirable that the plate should contain screen-like openings in the region where it exerts blows on the material.

Resilient diaphragms of metal, plastics material, impregnated materials, etc., can be used to obtain adaptability in the case of shaped parts. It is desirable for the resiliently deformable diaphragm to have grooves, preferably arranged parallel, at the side facing towards the layers, so that air bubbles can escape.

Means, such as cam shafts, are provided to displace individual areas of the diaphragm separated by grooves, substantially parallel with themselves, relative to adjacent areas.

If a relatively large number of blows is to be exerted on the laminate per second, it is an advantage to provide tamping means which oscillate with resonance frequency to transmit the blows to a belt which touches the layers.

In many cases it will be an advantage to construct and excite the oscillating system in such a way that individual portions of diaphragm oscillate at a plurality of superimposed frequencies. By superimposing a plurality of oscillations individual impulses of greatly increased amplitude can be formed, which will exert the desired tamping action. If blows of differing frequency are exerted in adjacent areas of the diaphragm, interference oscillations and thus impulses with steep sides will be produced in the intermediate regions between these areas. The individual tamped areas will naturally have higher amplitudes in the central field of the individual tamping areas than in the marginal areas. The alteration of the resonance fields or of the mechanically moved blows causes the blows to be carried out in adjacent areas with a grid-like arrangement.

In a preferred embodiment endless belts are used, which are brought into contact with the layers and by which blows are periodically exerted on the layers, in such a way that adjacent areas of the belts are tamped at different times. A plurality of metal belts may be guided parallel with one another over drums constructed as grooved rollers.

In many cases it is advisable to design the belts and the grooved rollers so that the tamped areas proceed in undulating movements as the tamping means moves forward; thus, each area is consolidated as the transporting means progresses.

If it is important for the belts to be kept tight, then blows are transmitted to the area of the belts touching the layers by a plurality of rollers arranged one behind the other in the transporting direction and extending transversely thereto, in such a way that at least two nesting groups of rollers are alternately rammed onto the belts. It is an advantage if one group of rollers is not lifted off the tamped belt until after another group of rollers has been rammed onto the surface of the belt.

According to the present invention there is also provided a method of making hollow bodies, particularly tubes, wherein a core rotating about its horizontal axis has fibrous material wound round it, the core turning in a trough filled with liquid plastics material, between the core and the bottom of the trough periodic blows are exerted in a substantially radial direction on the materials to be joined, and the amplitude of the blows is greatest in the narrowest region between the core and the bottom of the trough.

In a favourable production process for hollow articles, particularly tubes, webs or fibre, particularly glass cloth, are wrapped at a bias around a core preferably rotating about its horizontal axis, the core turning in a trough filled with liquid plastic material. Between the core and the bottom of the trough periodic blows are exerted substantially in a radial direction on the materials to be joined, and the stroke lengths of the blows are greatest in the narrowest region between the core and the bottom of the trough, as previously described. In addition, an impulse transmitter is arranged at the apex of the wrapped core and in case consolidates the webs wound onto it. An impulse generator arranged at the apex has swung pressure pads or another tamping surface suitably adapted to the shape.

For the method of the invention it is particularly important that the amplitude of the blows should decrease from a region of maximum stroke length towards the place where the material being treated leaves that area. In the production of fibre-reinforced plastic laminates this means that there will be a substantially higher pressure in the liquid plastic material in a limited region as compared with a marginal region.

If components, such as panels, profiled articles or tubes are to be provided with inserts, then inserts such as reinforcing profiles are placed on a layer of dry fibrous material and covered with a second layer of fibrous material before the blows are exerted on it. For this purpose it is an advantage for the tamping components, such as pressure pads, to have a surface adapted to the shape of the inserts.

In a further embodiment of the invention for making tubes, a flat sheet is first made, rolled into a tube shape in the unhardened state and then joined and consolidated in the region of the junction by substantially radial blows.

Naturally, it will be appreciated that many variations may be effected without departing from the spirit and scope of the present inventive concept.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing in which corresponding parts have been given the same reference numerals.

BRIEF DESCRIPTION OF THE DRAWING

FIGS. 26 to 30 show other embodiments of apparatus for making profiled and flat components of fibre-reinforced plastics.

FIGS. 35 to 44 show other modifications of the method of the invention and the associated apparatus for making hollow articles, such as tubes, silos, etc.;

FIGS. 45 to 48 show a modification of an apparatus and manufactured examples of hollow articles with reinforcing profiles laminated into them;

FIGS. 49 to 52 are diagrammatic representations of the impulse direction and the transporting movement; and FIG. 53 is a diagrammatically illustrated example of an apparatus for carrying out the invention.

DESCRIPTION OF THE PREFERRED EMBODIMENTS

Figure 1:
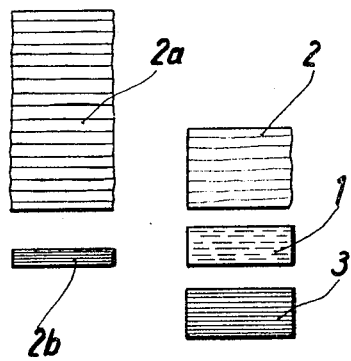
FIG. 1 shows examples of material.

In order to clarify the description which follows, the heights of the layers 1 of plastic and liquid resin, of the layers 2 of fibrous material and of the laminate or composite layer 3 are shown approximately to scale in FIG. 1. The layer 2 of fibrous material is assumed to consist of a fibreglass tissue mat with soluble binder; although an insoluble binder may be used.

Figure 2:
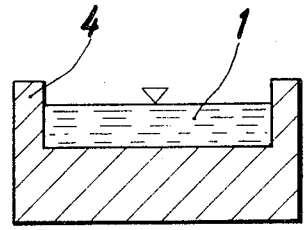
FIGS. 2 to 5 show some stages in the method of the invention, the apparatus being indicated diagrammatically.
Figure 3:
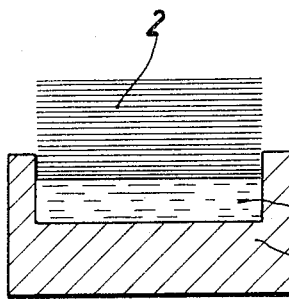
Figure 4:
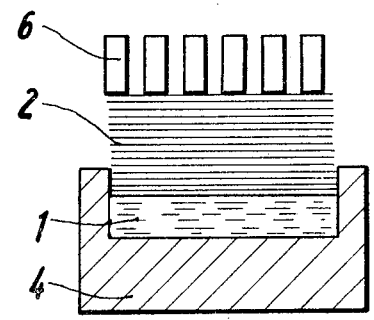
Figure 5:
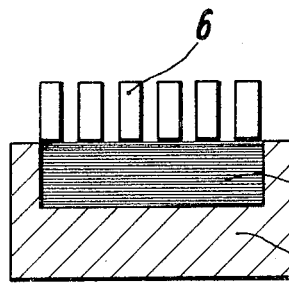

FIGS. 2 to 6 diagrammatically indicate the procedure used in the method of the invention. Liquid, unsaturated polyester resin mixed with catalyst and accelerator, is poured into the mould 4 (FIG. 2). Next, as indicated in FIG. 3, a fibre layer 2, consisting of a plurality of superimposed fibreglass tissue mats is laid loosely on it in the dry state. Then, as indicated in FIG. 4, blows are exerted on the fibre layer 2 from above by a group of impulse transmitters 6, thereby intimately combining the glass fibres with the polyester resin. The final state is indicated in FIG. 5. When the materials have been combined, polymerisation or curing begins, and this can possibly be accelerated by applying heat.

Figure 6:
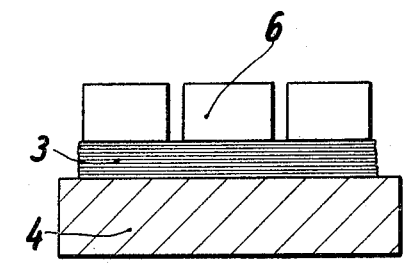
FIG. 6 shows a modification of FIG. 5 apparatus.

The diagrammatic representation in FIGS. 5 and 6 show the principle underlying an apparatus for making laminates according to the invention. The laminate 3, consisting of synthetic resin and embedded glass fibres, is consolidated by blows. For this purpose, blows are exerted on it by a plurality of impulse transmitters 6 and the laminate 3 is thereby compressed in certain areas between the impulse transmitter 6 and the mould or backing plate 4. The impulse transmitters 6 are at a certain distance from one another, for example 1 mm. FIG. 6 shows a similar apparatus with wider impulse transmitters 6.

Figure 7:
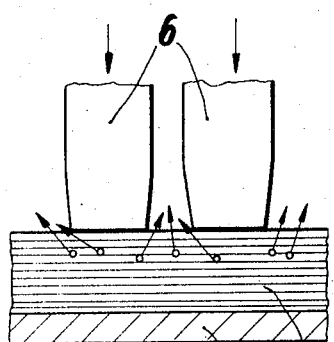
FIG. 7 is a diagrammatic representation to explain the invention.

FIG. 7 shows in diagrammatic, simplified form how the air bubbles contained in the laminate 3 are expelled from the tamped areas by blows exerted by the impulse transmitters 6, and how they move towards the gaps. Instead of the blows being applied from above by means of impulse transmitters 6, as indicated by the arrows in this and the other figures, it is basically also possible to apply them from below, for example to move the lower backing plate 4 upwards with a tamping action and to mount the parts 6, hitherto referred to as impulse transmitters, immovably, so that they act as grid-like backing plates.

Figure 8:
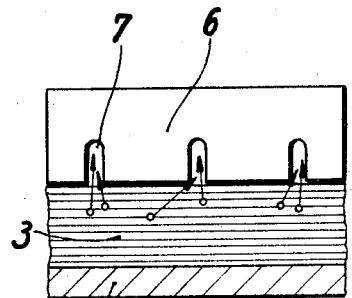
FIG. 8 is a detail of an apparatus for carrying out the invention.

FIG. 8 shows, in diagrammatic, simplified form, a modification, in which the impulse transmitter 6 is substantially wider. Apertures 7 in the underside serve initially to receive any expelled air bubbles until they can escape freely at the ends.

Figure 9:
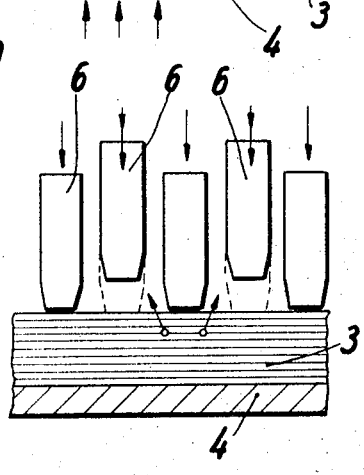
FIGS. 9 to 11 are modifications of apparatus for carrying out the method.
Figure 10:
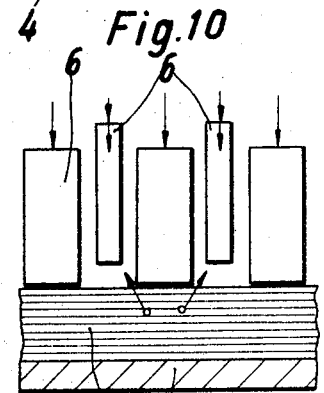

The diagrams in FIGS. 9 and 10 show the impulse transmitters 6 grouped and the blows taking place alternately in the two groups. In this case it is desirable for the completion of their blow, until the other group of impulse transmitters 6 exerts the next tamping action, and only then to be lifted off. In this way the impulse transmitters 6 serve not only for tamping but also for subsequently holding down the material.

It can be seen from FIG. 10 that the impulse transmitters 6 in one group, which are between those of the other group, can be narrower. With many laminates 3, particularly where the layers are thicker or more highly filled, it may be desirable to operate one group of impulse transmitters 6 at a different pulse frequency and pulse amplitude, so as to obtain more rapid expulsion of the air bubbles.

Figure 11:
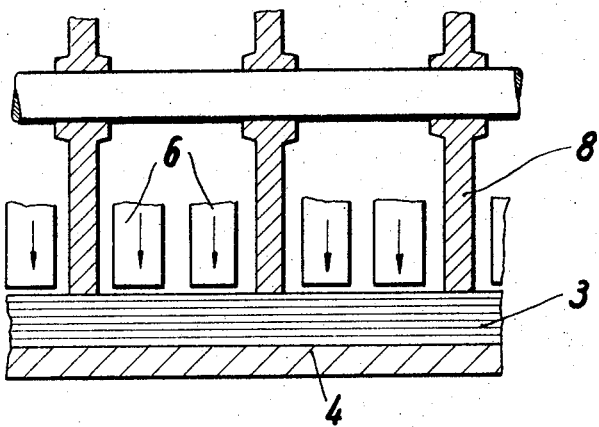

FIG. 11 diagrammatically indicates how the apparatus (not shown) carrying the impulse transmitters 6 is guided over the laminate 3 with supporting wheels 8. The sheet-like laminate 3 located in a mould 4 is progressively tamped area by area from one end of the sheet to the other.

Figure 12:
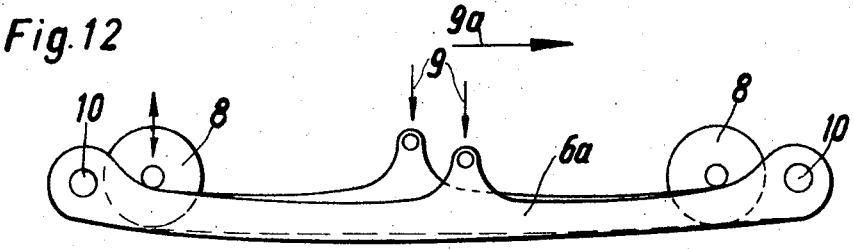
FIG. 12 is a diagrammatic side elevation of the FIG. 11 apparatus.

FIG. 12 is a diagrammatic side view of the arrangement shown in FIG. 11. Two skid-like (that is skid-shaped) impulse transmitters 6a have their ends mounted in bearings 10. Blows are alternately exerted on the central part of the impulse transmitters 6a in the direction of the arrows 9. The wheels 8 are provided near the ends of the impulse transmitters 6a. Connected to the wheels 8 is the chassis or framework (not shown) in which the impulse transmitters 6a are mounted. The side view shows that one impulse transmitter 6a is further depressed by the effect of the blow than the neighbouring one.

In the middle region of the pressing surfaces of the pressure pads, of the impulse transmitters the pressure may be between 0.5 and 25 p./cm.² Should it be desirable to use in special cases a higher pressure, then this can be achieved by a suitable base or by exerting blows on the lower side of said base. The frequency of the blows, preferably between 25 and 250 per second, can be higher in special cases.

Figure 13:
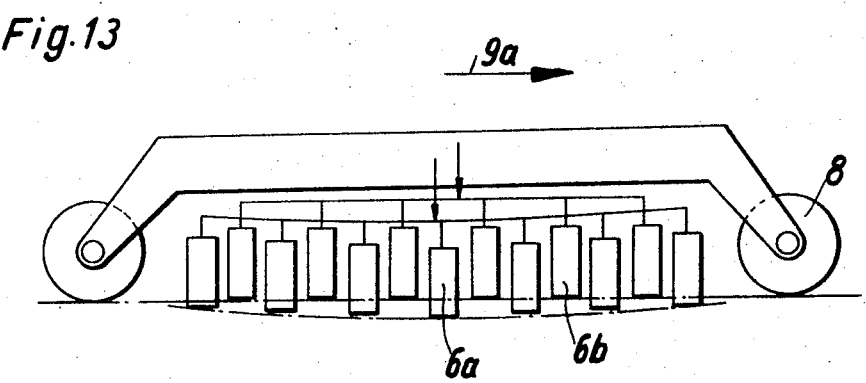
FIGS. 13 and 14 show other modifications of impulse transmitters used in carrying out the invention.

FIG. 13 diagrammatically shows a modification of the apparatus. The wheels 8, which may also be in the form of a continuous grooved roller, carry a frame in which groups of skid-like impulse transmitters 6a are arranged alternately, transversely to the direction of travel.

Figure 14:
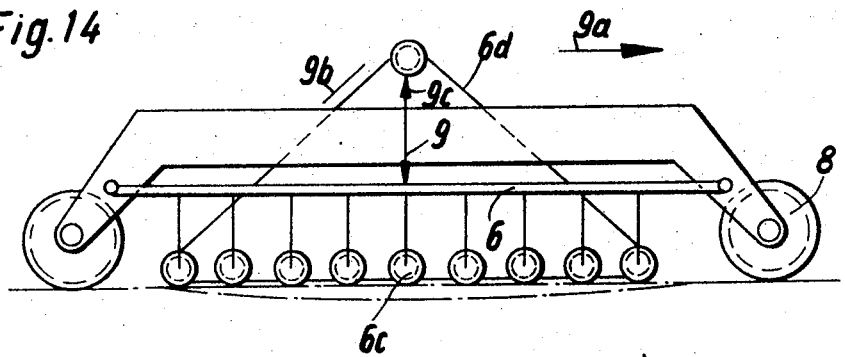

FIG. 14 shows a variation on this last modification. Here grooved rollers 6c with diameters of at least 15 mm. are arranged one behind the other and connected to an impulse transmitter 6 above them. If an impulse is introduced in the direction the arrow 9, the grooved rollers 6c strike the laminate to be consolidated, in such a way that maximum amplitude is obtained in the central field, as indicated by dash-dot lines. Metal wires or metal bands 6d guided between the grooves of the rollers act as skids and are drawn tightly over a deflecting roller at the top. Arrow 9a indicates the direction of movement and arrow 9b the tightening direction. Every other grooved roller 6c may alternately be rammed onto the wires or bands 6d, which are held down and which have a screen-like action.

Figure 15:
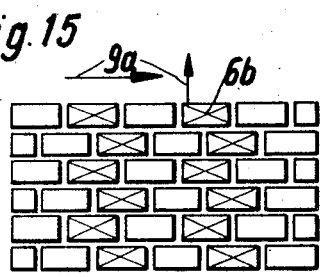
FIGS. 15 and 16 are diagrammatic representations of an arrangement of tamped areas.

In FIG. 15 the areas to be tamped are shown in plan; the cross hatched areas 6b indicate that the impulses are exerted alternately on the material to be consolidated. The transporting direction may be in both planes, as substantially the same effect is achieved. Such an apparatus may, for example, be transported by an arrangement similar to that in FIG. 13.

Figure 16:
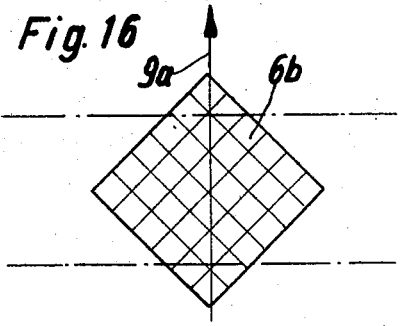

FIG. 16 indicates how small square areas 6b are alternately tamped. The transporting direction is indicated by the arrow 9a.

Figure 17:
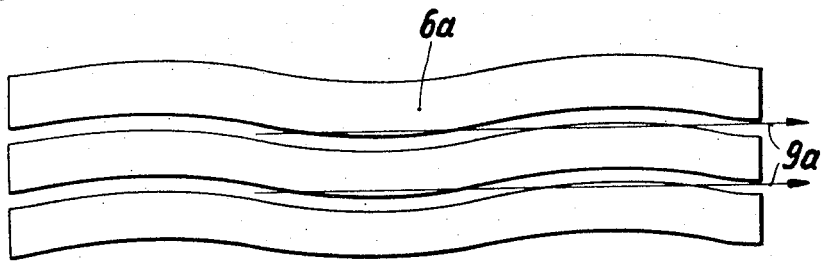
FIG. 17 shows a constructional detail in plan of a skid-like impulse transmitter of undulating shape.

In FIG. 17 undulating pressure pads forming the impulse transmitters 6a are shown in plan view. If the height of the undulations in the pressure pads is at least equal to the distance between the pads, this will ensure that every area of the laminate is tamped.

Figure 18:
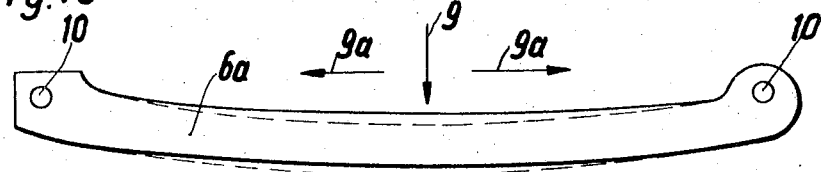
FIGS. 18 to 20 are side views of various skid-like impulse transmitters.
Figure 19:
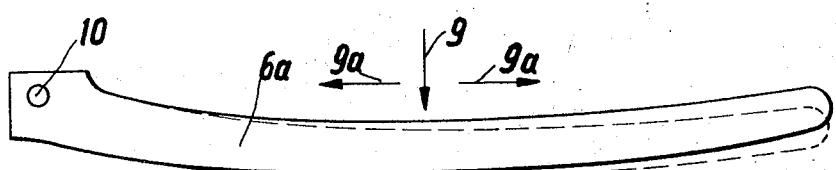
Figure 20:
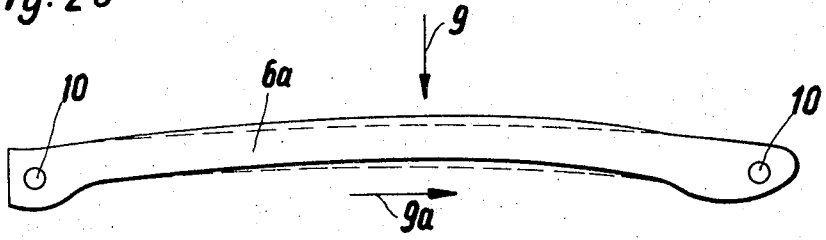

FIGS. 18 to 20 show three different embodiments of skid-like impulse transmitters 6a. In all the embodiments illustrated the tamping force of the pressure pad acting on the laminate is supplied in the central region, as indicated by the vertical arrow. The pressure pads in FIGS. 18 and 20 are mounted only in one bearing 10, that is for pivoting movement. The position and shape of the pressure pads during the tamping action is shown in broken lines.

Figure 21:
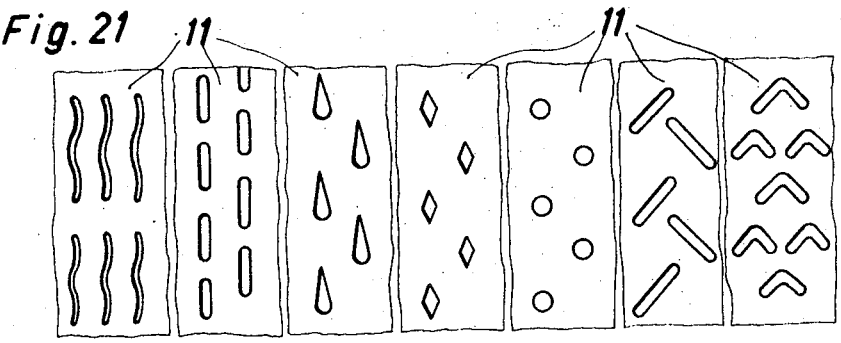
FIG. 21 shows modifications of the construction of the tamping surfaces of impulse transmitters.

The surface of the impulse transmitter which acts on the laminate may also be perforated; FIG. 21 shows seven different forms of such perforated surfaces 11 which have been used in practice.

Figure 22:
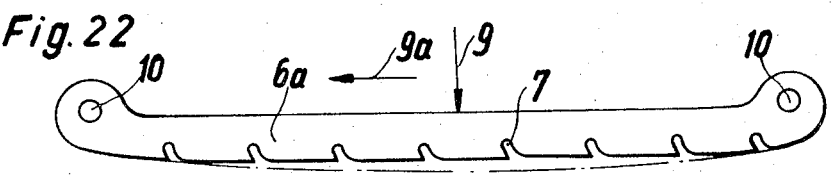
FIG. 22 shows a skid-like impulse transmitter with de-aerating apertures.

FIG. 22 is a side elevation of a skid-like tamping means 6a, provided on the lower side with apertures 7 extending transversely to the direction of travel. The apertures 7 serve initially to receive any air bubbles which are expelled, until they can escape freely. The effect of the blow acting in the centre (arrow 9) is to make maximum amplitude occur in the central field, as indicated by the dash-dot line.

Figure 23:
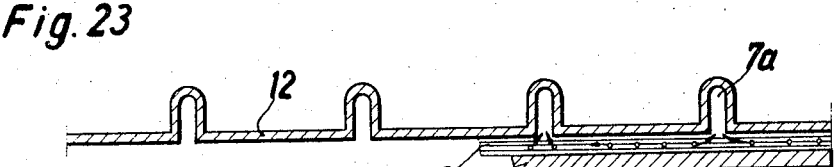
FIGS. 23 to 25 illustrate the procedure used in the method of the invention with another modification of the apparatus.

FIG. 23 shows another modification, in which a metal or plastics plate member 12 acts as the impulse transmitter. It contains upwardly directed corrugations 7a to extract the air expelled from the laminate 3. The path of the air bubbles is indicated by small arrows.

Figure 24:
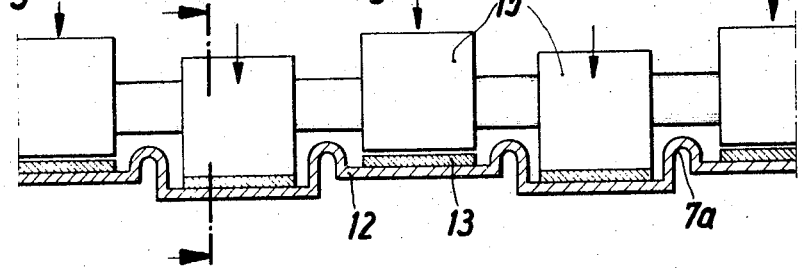

In FIG. 24 a variation on this impulse transmitter 12 of large area is alternately tamped via pressure distributing plates 13 by means of inversely arranged cams 15. The areas between the corrugations 7a are alternately rammed into the laminate to be consolidated, and then spring back immediately.

Figure 25:
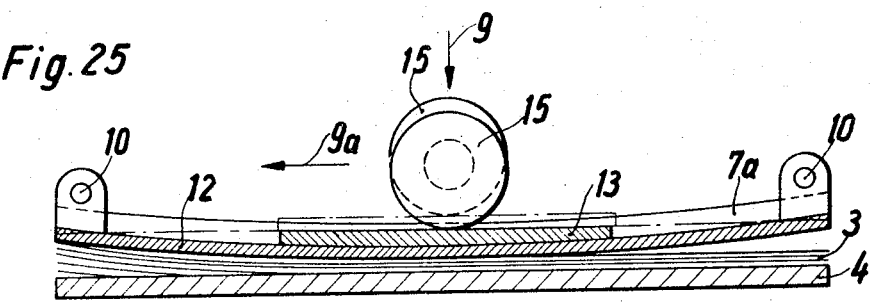

FIG. 25 is a side view of the FIG. 24 apparatus. The dash-dot line indicates the state of the adjacent, non-tamped area, while the impulse transmitter 12 and the pressure distributing plate 13 are shown with maximum amplitude. The cams 15 are illustrated one below the other with maximum and minimum amplitude. The corrugation 7a extends into the region of the bearings 10. The consolidated laminate 3 lies on the moulding plate 4.

FIG. 26 shows an impulse transmitting means closed at the sides and connected to the impulse exciting area 18 in the form of a plate. In the cavity there is an impulse transmitting media 17, such as a gas or liquid. Impulse transmitting areas 16 are produced with resonance or interference effects, and these areas 16 alternate in their action with the areas shown in dash-dot lines. The impulse transmitter 12 contains corrugations 7a, so that the areas in the consolidating medium are moved alternately up and down.

In FIG. 27 a simplified impulse transmitter 12 without any corrugations is connected to the impulse exciting area 18, so that alternate pulse transmitting areas 16 are again created and act on the laminate to be consolidated.

FIG. 28 shows how an arrangement like that in FIG. 26 can be adapted to a shaped article made of fibre and plastics laminate 3, while FIG. 29 similarly shows a FIG. 27 arrangement adapted to an article with a complicated shape. FIG. 30 shows a variation on FIG. 27.

Figure 31:
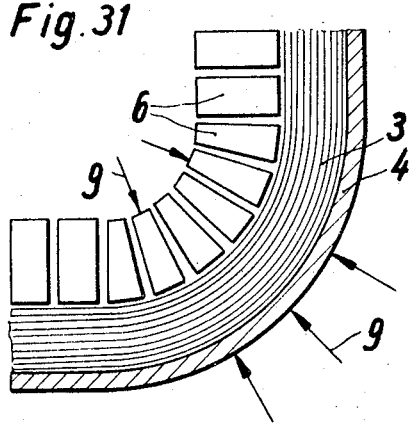
FIGS. 31 and 32 show an impulse transmitter for making shaped parts.
Figure 32:
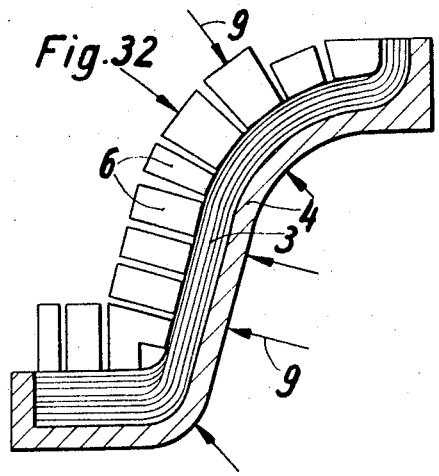

FIGS. 31 and 32 diagrammatically illustrate the manufacture of profiles and mouldings with impulse transmitters 6.

As indicated by arrows 9, the impulses may be introduced from the base plate 4 or the impulse transmitter 6 or else from both sides.

Figure 33:
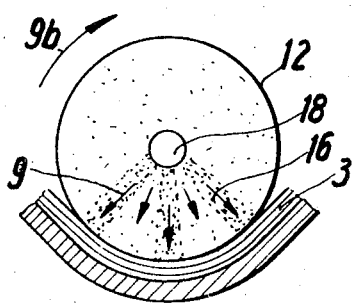
FIGS. 33 and 34 show modifications of an apparatus for carrying out the method.

FIG. 33 shows a further modification of the method according to FIGS. 27 and 30. The diaphragm-like impulse transmitter 12 incloses an impulse exciting area 18 mounted in the central plane. The impulse transmitting areas 16 act against the laminate 3 lying on the moulding plate 4.

Figure 34:
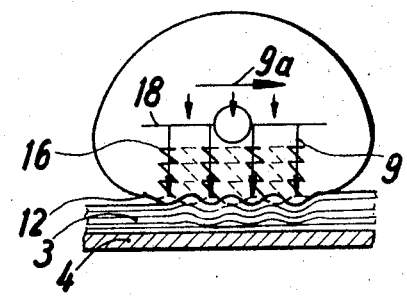

FIG. 34 shows a further variation. The particularly flexible impulse transmitter, designed so to speak as a jacket, takes on a flattened shape at the side to be consolidated. The impulse exciting area 18 produces alternate impulse transmitting areas 16 directed perpendicularly on to the laminate 3.

Figure 35:
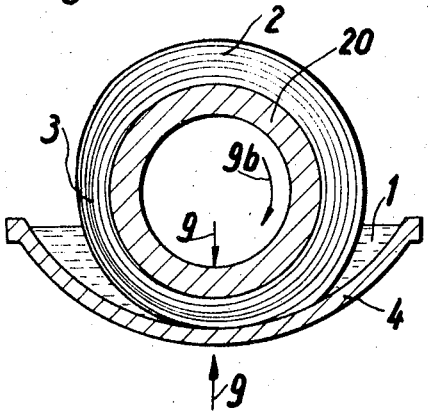

FIG. 35 is a simplified diagram of an apparatus for making tubes. The glass fibre layer 2, which is dipped into the liquid resin, is wound on to a core 20 rotating in the direction of the arrow 9b. As indicated by the vertical arrow 9, the core 20 is also moved downwardly in its lowermost portion with a ramming action, resulting in good joining and consolidating of the laminate 3 between the moved core and the surface of the mould 4.

Figure 36:
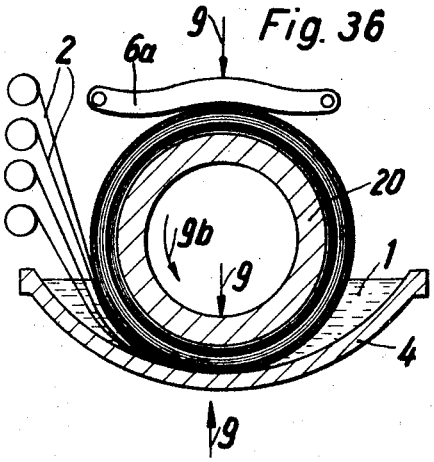

FIG. 36 shows a modification of the method described in conjunction with FIG. 35, which is particularly suitable for making high strength tubes. The fibrous material to form the layer 2 is unwound from a plurality of reels and several layers of it are wound with a bias on to the rotating core 20.

FIG. 37 diagrammatically illustrates a variation of the method explained in connection with FIG. 36. The fibre layers 2 are biassed and passed through a resin bath. They are wound around the core 20 and consolidated with the aid of the impulse transmitter 6a.

FIG. 38 illustrates another modification relating to the production of tubes and hollow bodies by a centrifuging process. In the interior of the core 20 an impulse transmitter 6 is rammed towards the mould 4 on to the laminate 3 to consolidate it. This enables a substantially higher proportion of glass fibres to be incorporated.

FIG. 39 shows another variation of the method of the invention for making tubes by means of a long mould 4 corresponding to the circumference of the tube. The fibrous material layer 2 placed on the liquid resin layer 1 is wound up by turning the core 20, the core 20 being moved in the direction of the arrow 9a. The core 20 simultaneously comes into action as an impulse transmitter in the direction of the vertical arrow 9, and the laminate 3 is consolidated impulse by impulse during the winding up process.

A modification of this method is indicated in FIG. 40. Here a resilient tubular core 20 is used and the impulses are conveyed, in the direction of the vertical arrow 9, from the impulse transmitter 6, through the resilient core 20, on to the material then below it.

Figure 41:
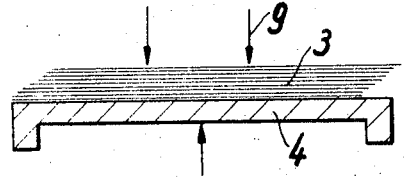
Figure 42:
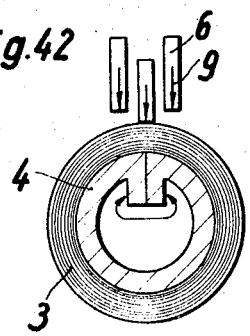
Figure 43:
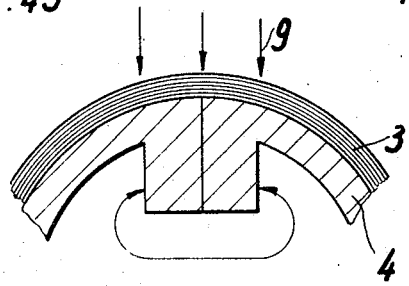
Figure 44:
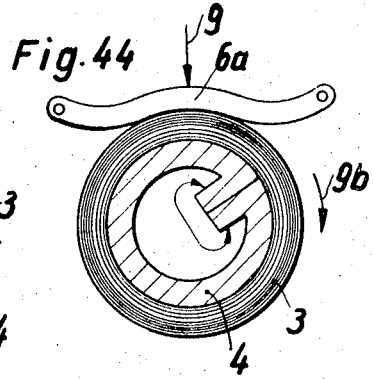

FIGS. 41 to 44 diagrammatically illustrate another variation of the method of the invention for making tubes. FIG. 41 indicates how the individual layers of glass fibre are combined with the durable resin on a flat plate 4; the tamping means have already been described several times and are omitted from this figure. The layers of glass fibres, which are of constant width, are superimposed with a lateral stagger. The flat laminate 3 is bent into a tube shape by apparatus (not shown), and, as indicated in FIG. 42, the as yet uncured laminate 3 is post-treated at the overlapped joint by impulse transmitters 6. The overlap produced by staggering the layers of fibre can be seen from the interrupted lines in FIG. 43. FIG. 44 indicates how additional revolving consolidation is carried out as a subsequent treatment by having the shape of the impulse transmitter 6a adapted to the surface of the tube.

Figure 45:
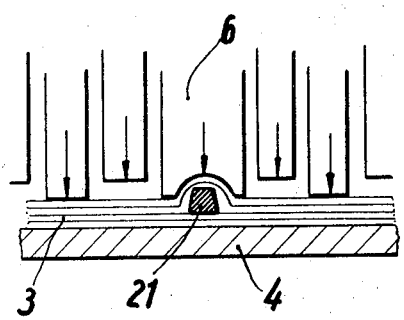

The method of the invention is eminently suitable for working inserts, such as metal reinforcements or profiles, into the laminate to increase the mechanical strength of the mouldings. FIG. 45 indicates how the appropriate parts of the surfaces of the impulse transmitters 6 are adapted to the shape of the inserts 21.

Figure 46:
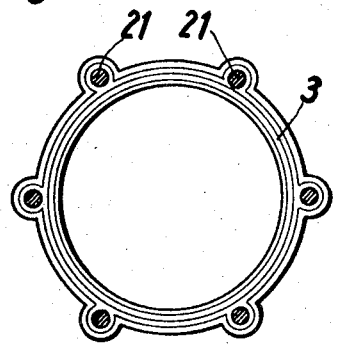

FIGS. 46 and 47 show cross-sections through tubes provided with axially parallel inserts 21 by the method of the invention.

FIG. 48 shows a tube reinforced with annular inserts 21. Instead of annular ones, inserts coiled in a helical shape may be used.

FIGS. 49 to 52, which are diagrammatic, show preferred impulse directions indicated by arrows. FIG. 49 represents the normal case with vertical impulses (arrow 9), in the central region. FIG. 50 shows an obliquely applied impulse (arrow 9), which may be located in the central region or else more towards the ends or bearing points. The purpose of the oblique impulse is simultaneously to consolidate the material and transmit energy in a horizontal direction, in order to bring about or facilitate the transportation of the laminate or impulse appliance.

The same function is fulfilled by the arrangement, shown diagrammatically, in FIG. 51, of two different impulses, which act simultaneously and should, if possible, both be variable. In FIG. 52, a cam plate 22 is shown diagrammatically; this is intended to show that the invention also covers the alternate variation of the impulses in arrangement, sequence, size and direction, either uniformly or in a different arrangement.

FIG. 53 is a partly diagrammatically simplified representation of an installation, which has been constructed in practice, to carry out the method of the invention. Adjacent, swinging impulse transmitters 6a and 6a' exert impulses on the laminate 3 made of plastic and resin. The impulse transmitters 6a and 6a' are combined into first and second grid groups, as already mentioned, in the description of FIGS. 9 and 10. They are mounted movably on bolts by means of slots 26 and 26', so that they can slide in a horizontal direction. Two eccentric plates 23 and 23' are driven by a motor 24, and the eccentric movement is transmitted to the pressure pads of the impulse transmitters by means of intermediate members 25 and 25'.

The cam 15 is in the form of a swash plate; this is provided by the oblique end of a plate driven by the motor 24. At the usual high speed of the motor (for example 1500 revolutions per minute) the oblique end transmits impulse-like blows by means of the intermediate members 27 and 27'; the lower part of the members 27 and 27' also serving to connect the even or odd impulse transmitters 6a and 6a' in their parallel grid-like arrangement.

The interaction between the movements brought about by the two eccentric plates 23 and 23' and by the oblique end causes the central portion of the impulse transmitters 6a and 6a' to be rammed on to the laminate 3; each impulse transmitters 6a and 6a' then remains on the tamped portion for a time, because the withdrawal of the tamping apparatus in the direction of the arrow 9 is compensated for by corresponding, opposite, relative movements derived from the eccentric plates 23 and 23'. The grid consisting of a plurality of parallel impulse transmitters 6a or 6a' is then lifted off the laminate 3 and displaced in the direction of the arrow 9 in the raised state by the action of the eccentric plates 23 and 23', whereupon it is again rammed on to the laminate 3 and so on.

During a working cycle of the impulse transmitters 6a, which are combined into a grid, the grid consisting of the impulse transmitters 6a' carries out a movement which is similar but shifted in phase. When the blow carried out by the impulse transmitter 6a or 6a' in one group has been completed, the impulse transmitters 6a or 6a' rest on the laminate 3 until the other group of impulse transmitters 6a' or 6a exert the next tamping action, and only then is the first group of impulse transmitters 6a or 6a' raised. In this way the impulse transmitters 6a and 6a' are used not only for tamping the material, but also for holding it down subsequently. Hence the motor 24 operates continuously whereas the impulse transmitters 6a and 6a' are moved over the laminate 3 in stages. The end face may carry additional moulded parts such as cams, to select the appropriate impulse pattern.

In an installation which has been used with success, the impulse transmitters were approximately 50 cm. long and 6 mm. wide. The gaps between the grids were 0.5 mm. The blows were exerted in the central field on impulse transmitters mounted at both sides, with an amplitude of 0.5 mm. and a frequency of 25 cycles per second over an area of approximately 50 x 50 cm., and the tamped surface was moved at speeds of between 1 m. per minute and 5 m. per minute. The results given below were obtained; in order to find out clearly the advance obtained, the comparative figures obtained with the conventional method of hand lamination are also quoted in each case.

1st Example

Polyester laminate, containing two glass fibre webs, a glass fibre mat of 450 g./m.$^2$ and a glass fibre tissue (so-called woven roving) of 680 g./m.$^2$, speed of movement during de-aeration 5 m./minute; time taken thus 12 seconds per metre.

Assuming a working output of 8 to 12 minutes per sq. m. area and per layer of glass mat in known hand lamination, then with an assumed working width of 5 m. (customary dimension in the building industry), this would require 100 minutes per metre length.

2nd Example

Polyester laminate, containing six webs of glass fibre, a glass fibre mat of 450 g./sq. m. and a glass fibre tissue of 680 g./sq. m., speed of movement during de-aeration 2 m./minute, that is 30 seconds per metre.

Hand-lamination would require 350 minutes per metre length.

3rd Example

Polyester laminate, containing 13 webs of glass fibre, a glass fibre mat of 450 g./sq. m., woven rovings of 680 g./sq. m., speed of movement during de-aeration 1 m./minute, that is 1 minute per metre length. The laminate contains 44.5% glass.

Hand-lamination would require 700 minutes per metre length.

4th Example

Polyester laminate, containing 13 layers of glass fibre mat of 450 g./sq. m. and a glass fibre tissue of 680 g./sq. m., also every 100 parts of polyester resin mixed with 150 parts of filler and 30 parts of styrene. In this case, about half the layers were first mixed with about half the resin mixture and, after these had been consolidated once by tamping, the rest of the layers and the remainder of the resin mixture were applied. Speed of movement during de-aeration 1 m./minute, that is a speed of 2 minutes per metre length for double tamping.

Hand lamination theoretically 700 minutes per metre length, but in actual fact impracticable, as such a high filler content cannot possibly be laminated by hand.

With the same installation and a speed of movement during de-aeration of 2 m./minute and blows having an amplitude of 2 mm., a laminate without air bubbles has been made of 24 glass fibre webs of 450 g./sq. m., each covered with one woven roving. The mixture was the same as in the fourth example.

The time for manufacture can be reduced to 1/500 of the hitherto necessary time. With the above mentioned continuous production method it is possible to make in one procedure plates up to 100 mm. thick which may contain up to 50% glass fibre, mats of 70%, 200% filler (referring to 100% resin). Hitherto it was not possible to make laminates with such a high percent of filler owing to the resulting high viscosity.

The invention can be used for all known methods in which duroplastic resin/filler mixture is reduced. The said distances are between 0.01 mm. and 5 mm., preferably between 0.1 mm. and 1.2 mm., especially between 0.1 mm. and 0.7 mm. For a viscosity of about 600 cp. a distance of 0.05 mm. to 0.3 mm. and for a viscosity of about 1500 cp. a distance of 0.5 mm. is recommended.

If one pressure pad is at its lowest position the adjacent pressure pads should be at its uppermost position. The range of its movement (amplitude) is usually between 0.01 mm. and 3 mm., preferably between 0.1 mm. and 1 mm. It is essential that the acting surfaces of the pressure pads at their lowest position are below the surface of the laminate. If the pressure pads are moved with a frequency between 25 and 50 per second, there is recommended an amplitude of about 10% of the thickness of said laminate.

If the frequency is raised, then the amplitude of the pressure pads should be reduced.

The method of the invention is suitable for making flat and profiled building panels for the walls of buildings, for making corrugated tracks (Wellbahnen) and insulating plates for the purposes of the electrical industry, and also for swimming-pool components. It is also very suitable for making hollow bodies, such as pipes, components for silos, tower constructions, containers or oil tanks. Specially shaped profiles can also be produced in this way.

Mouldings which cannot be unwound, such as dome-shaped roof lights, parts of car bodies and the like can be made with portable impulse transmitting means.

The method of the invention is distinctive in particular, in that it not only greatly improves the quality of the laminate produced, but also substantially reduces manufacturing costs, as compared with the methods hitherto used in practice. Thus, in the case of heavy mouldings, such as hand laminated, dome-shaped roof lights, the number of working hours required is cut down to $\frac{1}{15}$ of the number previously necessary, and to $\frac{1}{500}$ in the case of thick-walled components with a large area. The precision of manufacture permits a saving in material in nearly all applications. For many applications this is the first time the excellent properties of the laminate can be put to practical use.

The method described of consolidation by tamping is also suitable to obtain substantially better quality and saving of material with a considerable saving of time, even in conjunction with other known manufacturing processes; for example tubes or hollow bodies, tanks, etc., can be produced by the centrifuging method known per se, but whereas with the centrifuging process only a maximum glass content of 30% can be obtained, and that without complete de-aeration, a glass content of up to 45% can be achieved without any difficulty by means of an additional impulse appliance arranged inside. Fillers may also be added to save material or to vary electrical conductivity. Then variation of electrical conductivity is of great importance, particularly for tanks with combustible fluids, such as oil tanks. With known methods of making hollow bodies, it is only with difficulty that up to 25% of the filler can be incorporated. With the method of consolidation by tamping, a filler content of up to 60% weight has, for example, been satisfactorily worked into a laminate without any difficulty.

Many possible modifications will become apparent from the foregoing without departing from the spirit of the present invention. However, the foregoing disclosure is presented in an illustrative sense rather than a limiting sense and the appended claims are relied upon to define the scope of the present invention.

What is claimed as new and desired to be protected by Letters Patent is set forth in the appended claims:

1. In a method of making articles from fiber-reinforced plastic material, the steps of placing a layer of fibrous material on a layer of liquid plastic material so as to form a composite layer having a general plane; subjecting the composite layer to tampings acting upon it in a direction substantially normal to said general plane, alternately in portions of first regions and thereupon in portions of second regions which are located intermediate said first regions; effecting displacement of said composite layer in substantial parallelism with said general plane between tampings acting upon said composite layer; and decreasing the amplitude of said tampings on the portions of each first or second region from a maximum to a minimum amplitude in direction towards an adjacent second or first region, respectively, so that in each of said regions the portions located nearer to such adjacent region are subjected to tampings having a decreased amplitude.

2. In a method as defined in claim 1, wherein the step of subjecting the composite layer to tampings comprises maintaining pressure upon the portions of said first or second region following the tamping of such portions, until tamping of the regions of said second or first region, respectively, takes place.

3. In a method as defined in claim 1, wherein said first regions are spaced from the respective second regions by between 0.1 mm. and 10 mm.

4. In a method as defined in claim 1, wherein each of said regions is subjected to at least three tampings per second.

5. In a method as defined in claim 1, wherein said first or second regions are of larger dimension than said second or first regions, respectively.

6. In a method as defined in claim 5, wherein the respective regions are subjected to tampings at differential frequencies and amplitudes.

7. In a method as defined in claim 1, wherein the respective regions are subjected to tampings at differential frequencies and amplitudes.

References Cited
UNITED STATES PATENTS 2,416,721   3/1947   Upson _____ 117—65.2

FOREIGN PATENTS 218,840   7/1924   Great Britain _____ 117—65.2

PHILIP DIER, Primary Examiner

U.S. Cl. X.R.

117—65.2, 66; 156—380, 581; 264—26, 69, 258